Figure 1:
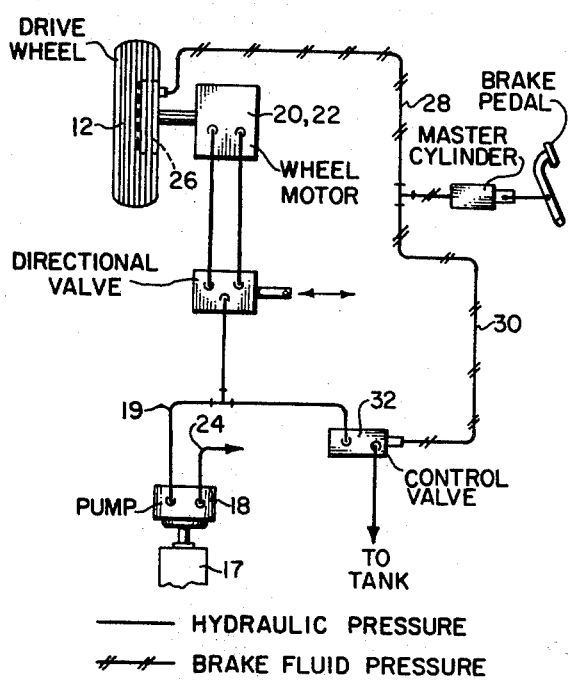

United States Patent

[11] 3,583,135

| [72] | Inventor | Vernon P. Broussard |
| | | P. O. Box 227, Saint Martinville, La. 70582 |
| [21] | Appl. No. | 776,451 |
| [22] | Filed | Nov. 18, 1968 |
| [45] | Patented | June 8, 1971 |

[54] SUGAR CANE HARVESTERS
3 Claims, 5 Drawing Figs.

[52] U.S. Cl. ..................................................... 56/14.3, 180/53, 137/101
[51] Int. Cl. ..................................................... A01d 45/02
[50] Field of Search ......................................... 56/15, 16, 17, 63; 180/53; 137/101

[56] References Cited
UNITED STATES PATENTS

| 2,482,530 | 9/1949 | Wurtele | 56/17 |
| 2,974,464 | 3/1961 | Thornton | 56/17 |
| 3,061,032 | 10/1962 | Ritter et al. | 180/53 |
| 3,279,558 | 10/1966 | Allen et al. | 137/101 |
| 3,375,642 | 4/1968 | Willett | 56/15 |

Primary Examiner—Antonio F. Guida
Attorney—James B. Lake, Jr.

ABSTRACT: A sugarcane harvester and piler having a tricycle powered train for providing mobility and powering a plurality of interconnected power drives for easy and instantaneous control of the harvester wherein the application of hydraulic brakes to stop the power train also cuts the hydraulic drive to the driving wheels of said power train but not to the auxiliary drives, and mounting a cane cutter with leading cutting edge on the line joining the points of contact of the front wheels with the ground said cutter with said front wheels following the ground contours to permit closer positioning of the cane cutter to the ground for cutting a greater length of cane and a can topper driven independently of the cane gatherer to position gatherer drivers at the perimeter of the cane topper for shortening the path of cut tops before falling freely off the machine to thereby keep most of the tops from falling into the machine.

INVENTOR.
VERNON P. BROUSSARD
BY Lake & Pugh
ATTORNEYS

INVENTOR.
VERNON P. BROUSSARD
BY Labe & Pugh
ATTORNEYS

SUGAR CANE HARVESTERS

The invention relates generally to sugarcane harvesters for cutting and piling sugarcane and more particularly to a harvester with interconnected driving means for easier control and improved location for cane cutters to cut a greater length of cane and cane toppers to operate more efficiently.

This is an improvement of my invention described in my application for patent for sugarcane harvesters, Ser. No. 602,638 filed Dec. 19, 1966 and now U.S. Pat. No. 3,481,121 issued Dec. 2 1969.

It is an object of the invention to integrate and interconnect all the power drives of the harvester for ease of operation and control.

Another object of the invention is to provide a cutting disc located for cutting maximum lengths with minimum interference from the ground.

Another object of the invention is to provide an improved method and apparatus for topping the cane and preventing said tops from falling into the machine.

Figure 2:
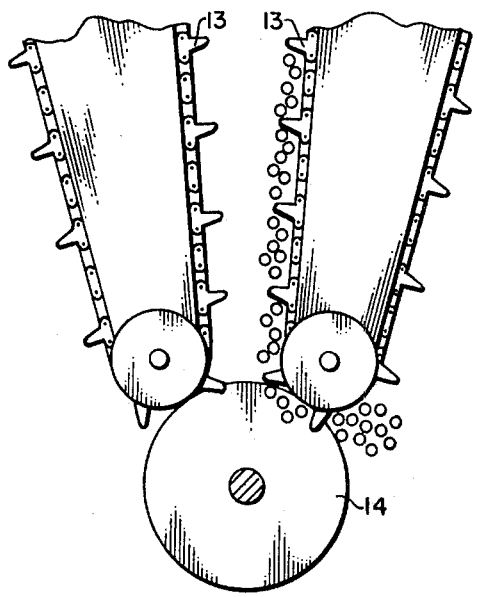
Figure 3:
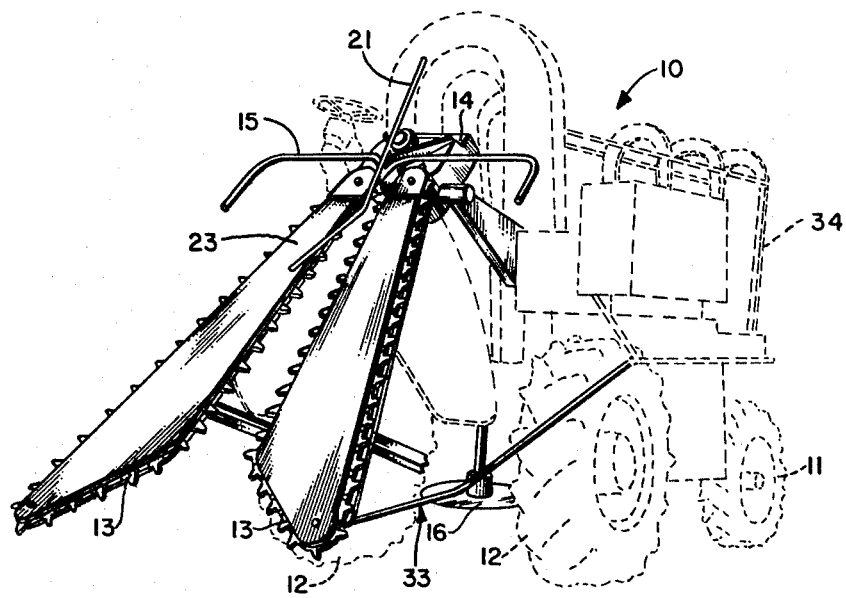
Figures 4, 5:
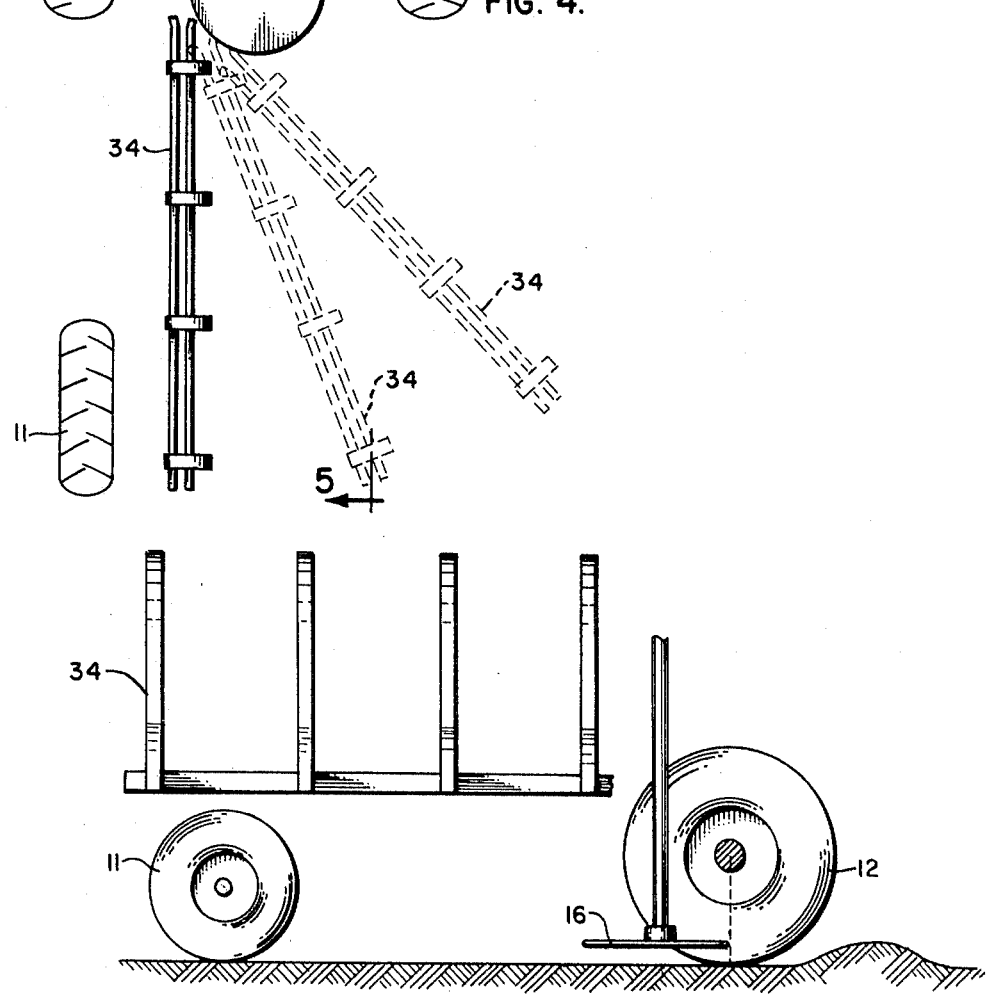

Other objects and a fuller understanding of the invention can be had by examining the description and claims and drawings that follow:

FIG. 1 is a diagrammatic outline of the interconnection of the brake hydraulic system and the hydraulic wheel and auxiliary drives of the power train, FIG. 2 is an enlarged view of the cane gatherer and cutting topper, FIG. 3 is a perspective view of the cane gatherer and topper shown mounted on a phantom power train, FIG. 4 is a plan view of the chassis of the power train showing the location of the circular cane cutter with respect to the front driving wheels, and FIG. 5 is a side view of FIG. 4 along section lines 5-5 showing the vertical portion of said cutter above the ground.

Referring to FIG. 3, the invention comprises the combustion of a tricycle power train 10 hydraulically driven and controlled, and having a steerably rear wheel 11 mounted aft and large front driving wheels 12 mounted forward, with a cane gatherer 13 and top cutter 14 (See FIGS. 2 and 3) for gathering and cutting the tops off of the cane. The latter are mounted on the power train ahead of the driving wheels. A circular cane cutter 16, for cutting cane adjacent the ground, is mounted on the power train with its leading cutting edge on a line tangent to the points of intersection of said two driving wheels with the ground. By locating the cutter 16 at this particular point the possibility of the cutter engaging the ground when there is any uneveness in the field is possible only when the uneveness is less than the width between the front two driving wheels.

In the topping mechanism the gatherers 13 comprise a pair of endless gathering chains driven upwardly in adjacent runs that cooperate to gather cane as a harvester passes down a row, and are separately driven from the topping cutter 14 in order that the gathering chains rotating around the gathering drive may be located on the perimeter and tangent to the topping cutter thereby shortening the path of the cut tops so that they do not fall into the machine but are directed outwardly and free of the machine. A stationary transverse guide 15 with hooked ends is mounted above the topping cutter 14 as shown in FIG. 3 to prevent the cut tops from being thrown into adjacent rows of cane. A cane guide 21 is mounted above the gatherers 13 and normal to guide 15 as shown in FIG. 3. An angled portion 23 extends downwardly between said gatherers and the cane guide as illustrated in FIG. 3 with the angled portion pointed to one of the gatherers diverts all the cane between the gatherers to the side of the top cutter 14 opposite the direction of pointing.

The power train is hydraulically driven in all its aspects. (See FIG. 1). The main motor 17 drives hydraulic pump 18. An hydraulic pressure line 19 from said pump 18 drives hydraulic motors 20 and 22 respectively attached to the two front driving wheels and a separate hydraulic pressure line 24 goes to power the auxiliaries, that are the cane gatherers, the topping cutter, the pilers, and the cane cutter between the two front wheels. The power train has hydraulic brakes 26 that operate on brake fluid pressure lines 28, a branch 30 of this line 28 is brought down to a control valve 32 in the hydraulic pressure line 19 driving the front wheels 12. Hydraulic lines 28 and 30 are actuated by the brake cylinder. Any application of brake fluid pressure in line 28 to initiate the application of brakes redirects through valve 32 the hydraulic pressure fluid for driving the wheels back to a reservoir or tank rather than to the wheels thus achieving a double means for stopping the forward motion of the harvester without the need for the application of a clutch and without disconnecting the hydraulic pump which furnish the hydraulic drive pressure, not only to the wheels but also to the auxiliaries. These auxiliaries continued to operate normally when the brake is applied. This is a great advantage when the harvester approaches the edge of a field and must necessarily stop for a turn but must continue to pile the cane that is in the machine.

The harvester is provided with a conventional cane guard 33 mounted on one side to extend for the full length of the harvester to deflect standing cane from rows adjacent the harvested row clear of the harvester.

A conventional cane piler 34 is indicated in dash lines in FIGS. 3 and 4 on the harvester. The piler is adapted to pivot to the positions indicated in FIG. 4 in broken lines in order to provide for piling the cane harvested from three rows on one of the rows for easier collection.

Both the cane guard 33 and the piler 34 are well known on the prior art and are shown only to present an entire working harvester. Neither constitutes a claimed improvement.

What I claim is:

1. An improved hydraulically driven perambulating sugar harvester having a power train, a braking apparatus and front wheels, comprising in combination: an hydraulic pump driven by said power train and having separate pressure lines carrying pressure fluid for driving the harvester in locomotion and the auxiliaries for gathering, cutting and piling the cane in the field; means connected in the pressure line for driving the harvester in locomotion and to said braking apparatus that is responsive to the actuation of said braking apparatus to divert and recycle the pressure fluid in said pressure line back to said hydraulic pump, releasing said harvester from locomotion and maintaining the pressure in said lines to said auxiliaries.

2. A sugar harvester as described in claim 1 wherein said auxiliaries for gathering comprises a pair of endless gathering chains driven upwardly in adjacent runs that cooperate to gather the cane as the harvester passes down a row; and a circular topping cutter mounted with its cutting perimeter tangent to the highest run of said gathering chains to thereby cut the cane tops as they pass out of the gatherers.

3. A sugar harvester as described in claim 1 wherein said auxiliary for cutting comprises a circular cutter mounted adjacent the ground and between the front wheels with its leading perimeter tangent to a vertical plane through the centers of rotation of said front wheels, whereby said cutter is carried by said wheels over all obstacles of less than the distance between said front wheels and without reference to the fore and aft wheel base of the harvester.